Oct. 17, 1967  R. G. GODDING  3,348,140
MEASUREMENT OF MOISTURE CONTENT IN SAND AND LIKE MATERIALS
Filed Jan. 30, 1963  19 Sheets-Sheet 5
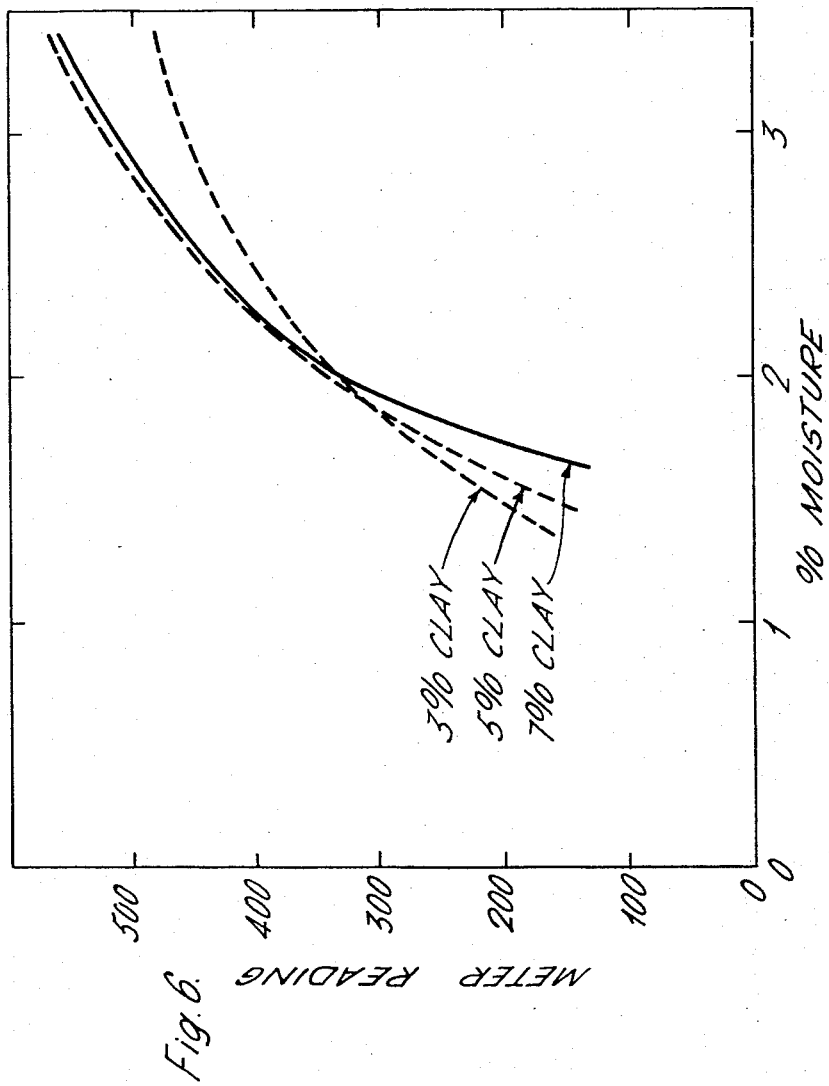

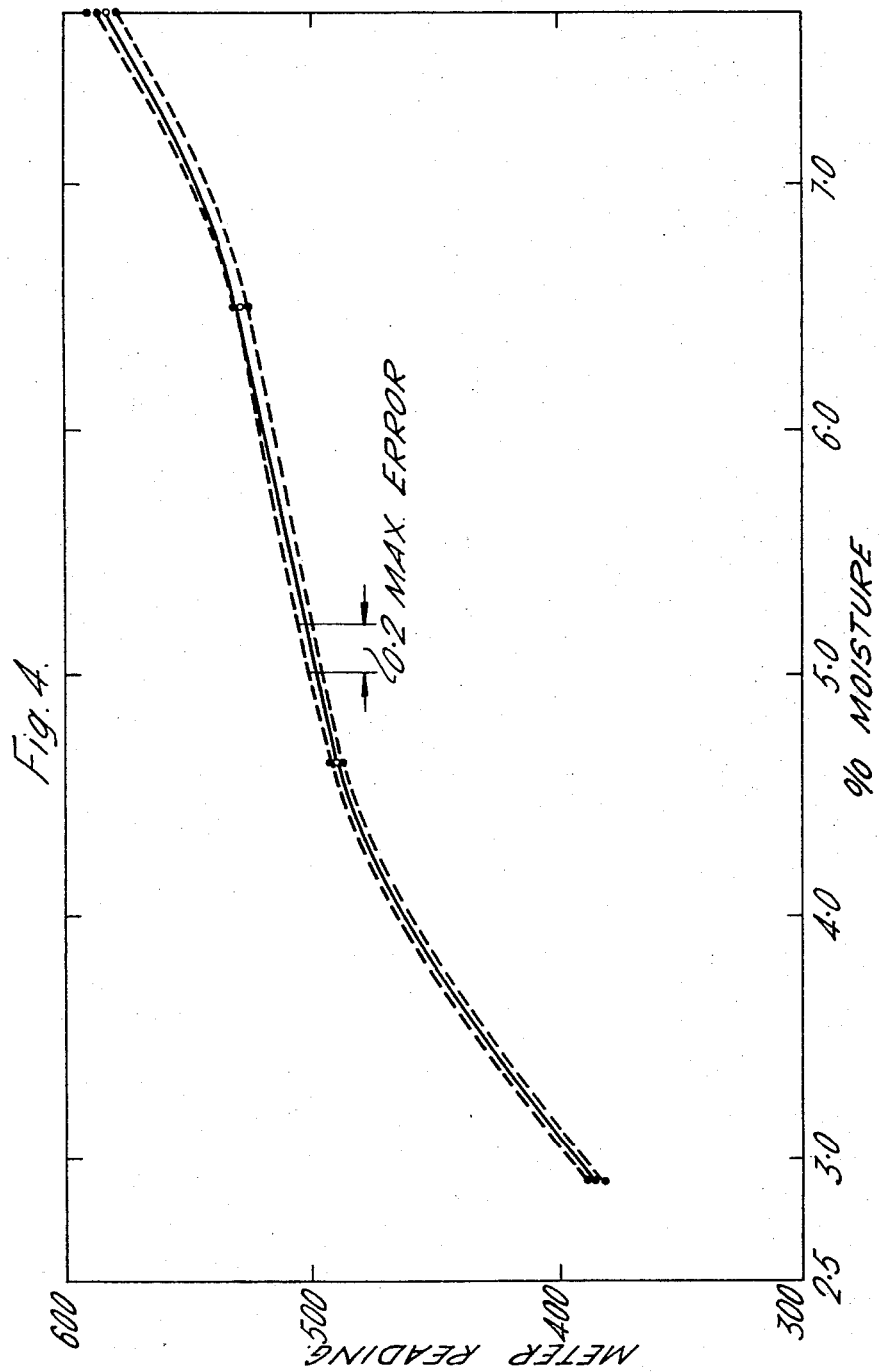

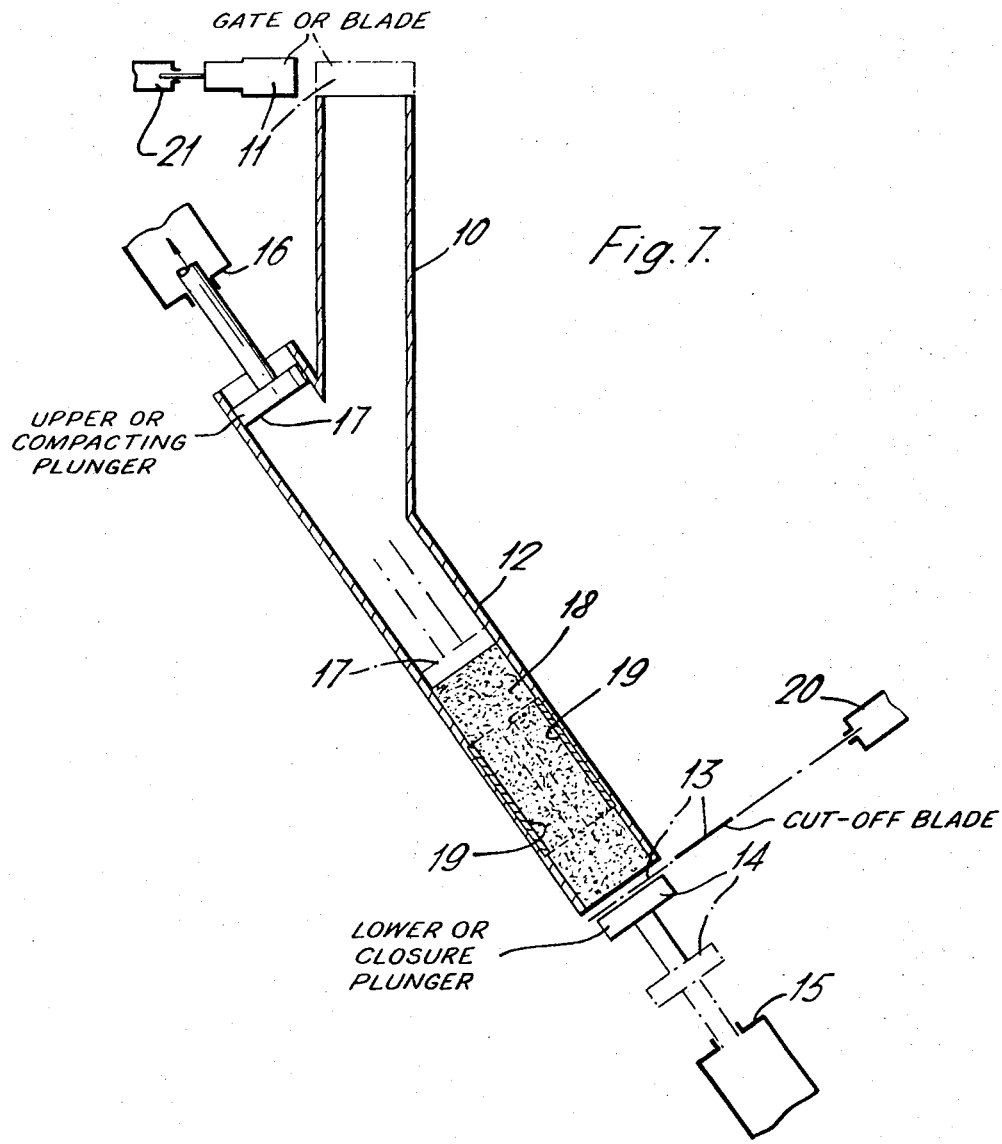

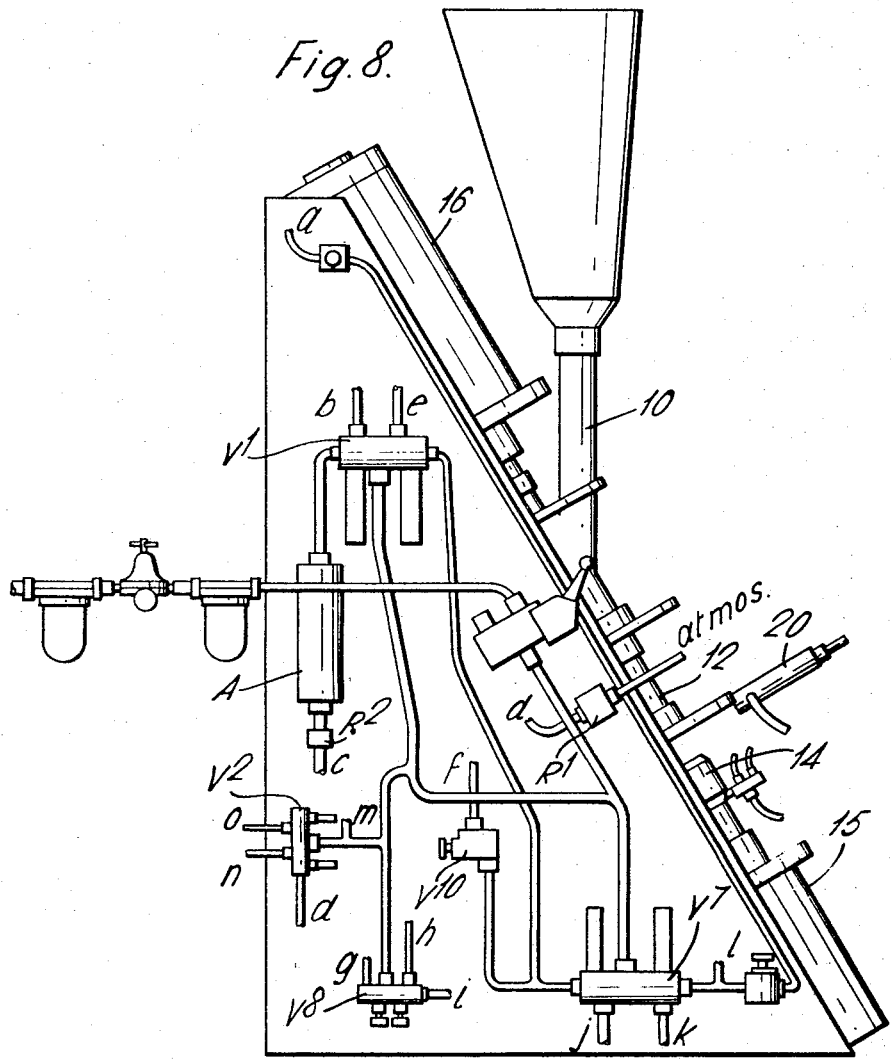

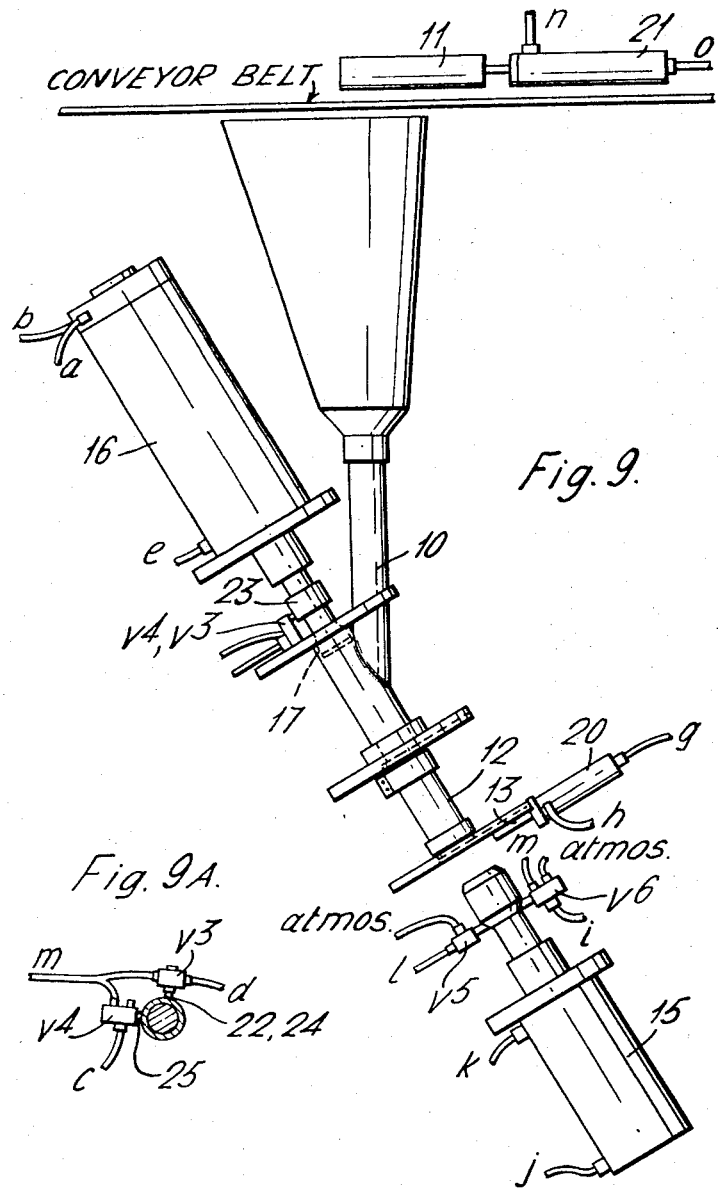

Oct. 17, 1967  R. G. GODDING  3,348,140
MEASUREMENT OF MOISTURE CONTENT IN SAND AND LIKE MATERIALS
Filed Jan. 30, 1963  19 Sheets-Sheet 9
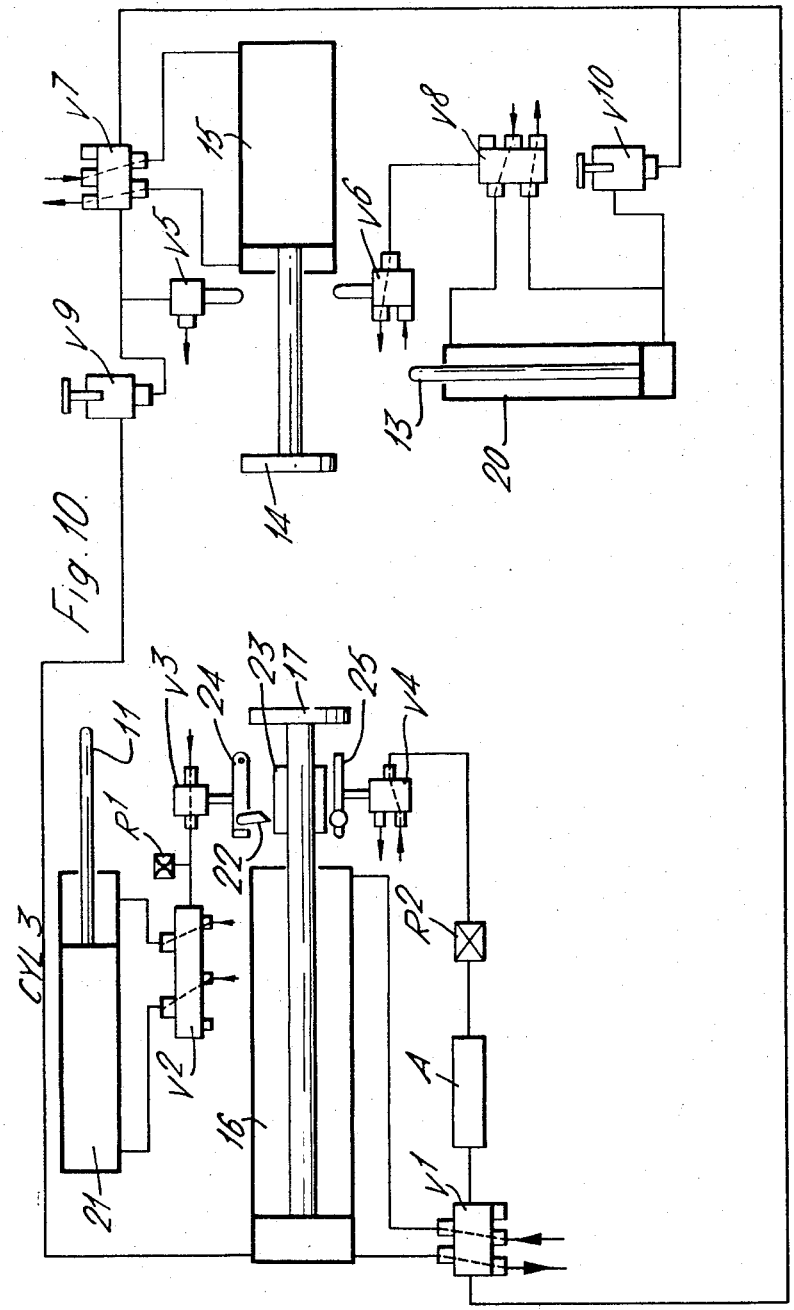

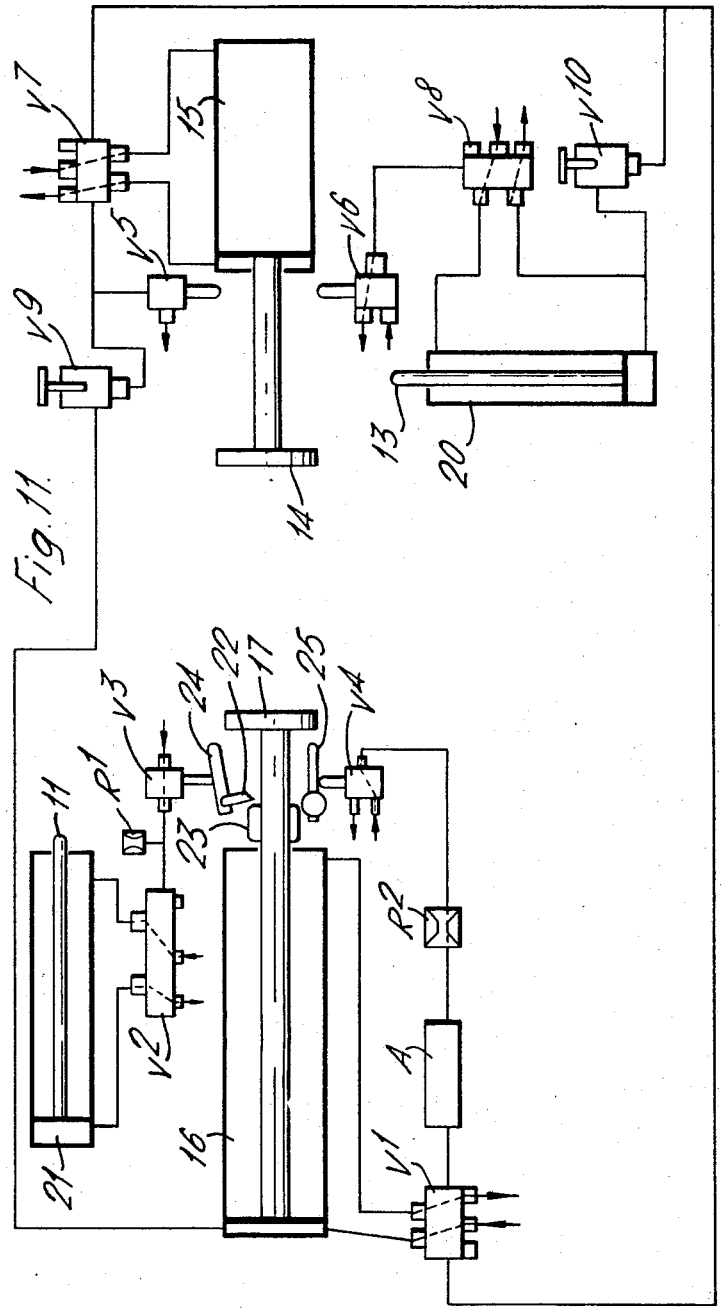

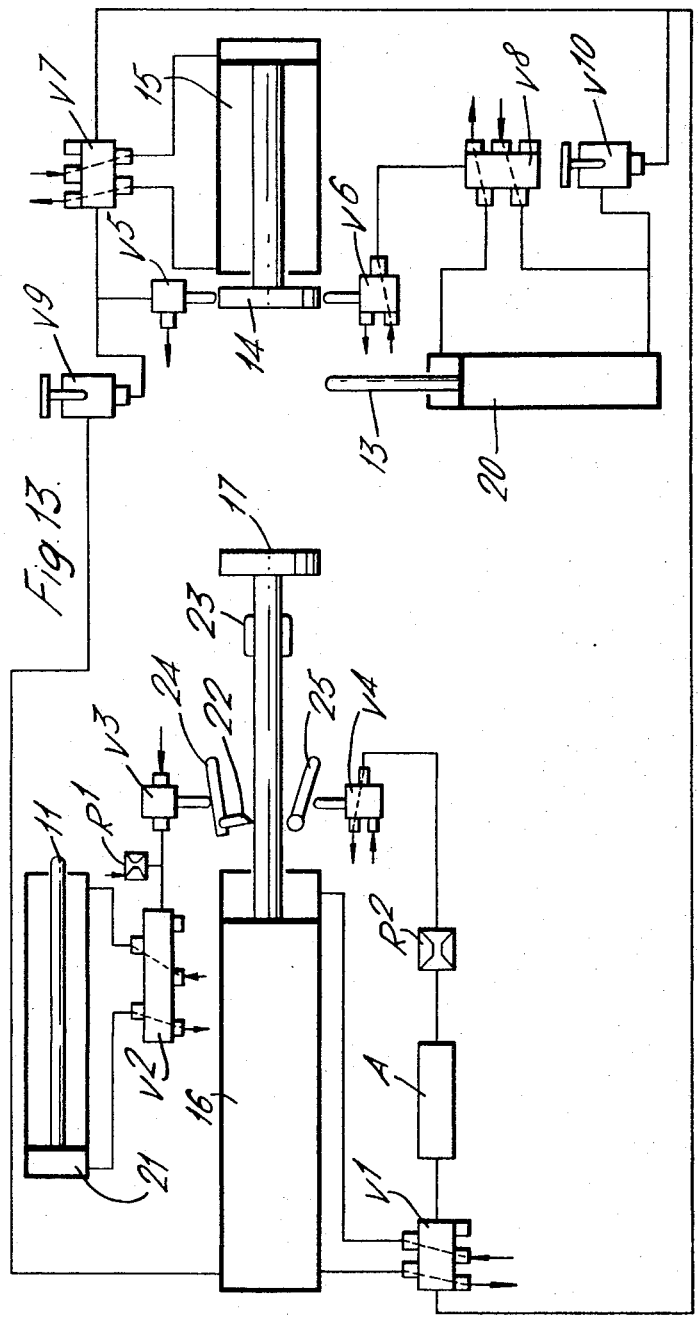

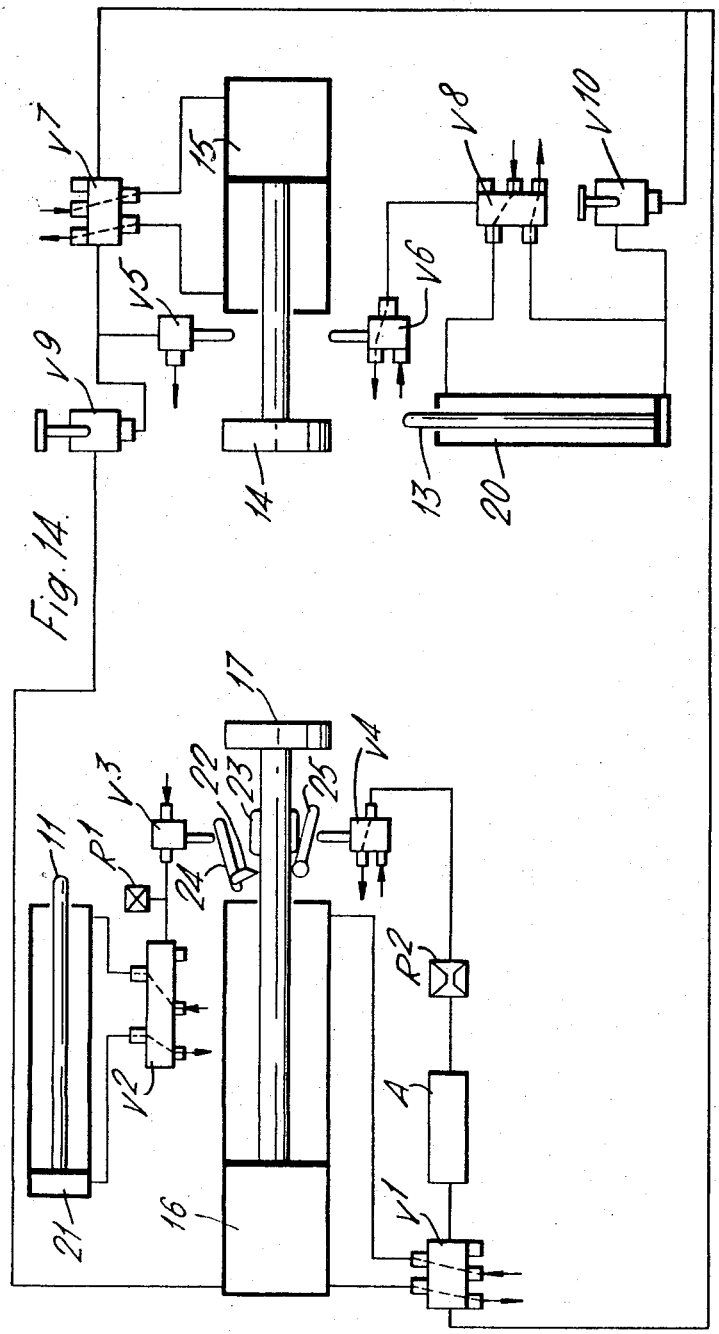

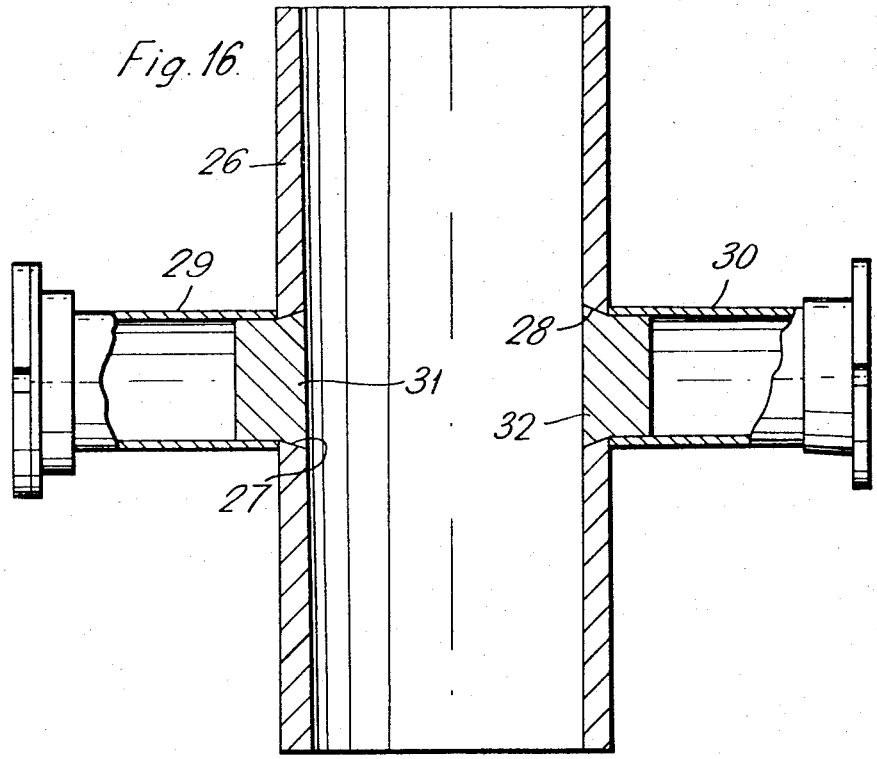
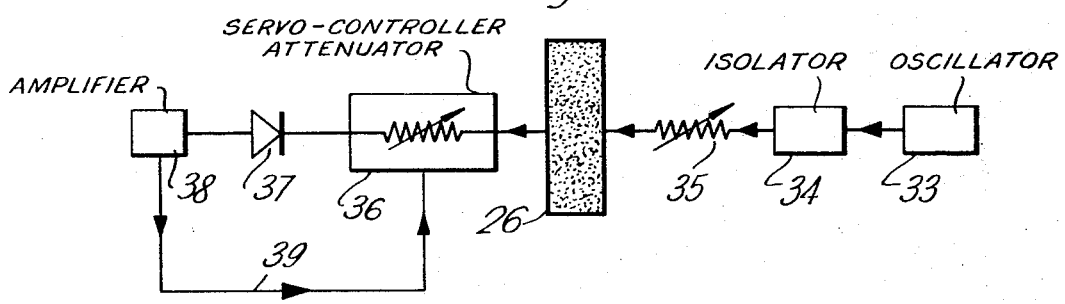

Oct. 17, 1967  R. G. GODDING  3,348,140
MEASUREMENT OF MOISTURE CONTENT IN SAND AND LIKE MATERIALS
Filed Jan. 30, 1963  19 Sheets-Sheet 17

3,348,140
MEASUREMENT OF MOISTURE CONTENT IN SAND AND LIKE MATERIALS
Ronald G. Godding, West Heath, Birmingham, England, assignor to The British Cast Iron Research Association, Birmingham, England, a British company
Filed Jan. 30, 1963, Ser. No. 255,032
Claims priority, application Great Britain, Feb. 3, 1962, 4,234/62
9 Claims. (Cl. 324—58.5)

This invention relates to the determination of the water or moisture content of sand and like granular pulverulent material, that is to say granular material which, in the mass, is capable of taking up water in the interstitial spaces and which is capable of compression to a higher constant or approximately constant packing density and, when compressed, shows a degree of cohesion. The present invention has for an object to provide means for the rapid and accurate measurement or control of such water or moisture content with particular (although not exclusive) reference to foundry sands.

Various methods have been used for the determination of the water content of granular materials such as sand, and both continuous and batchwise systems are known. Normally, however, the instrument for detecting or measuring water content of a body of granular material has operated on the material in a relatively free state—that is on the material or a sample as it passes along a conveyor or chute, or lies at rest under gravity in a container. This has led to erratic or inconsistent results, due primarily to the fact that most instruments are particularly sensitive to changes in density which seriously affect their calibration. This is especially true of instruments which measure an electrical characteristic of the moist material. For example, the density of packing of a clay-bonded sand decreases with increase in its water content over the range most frequently used in foundry moulding sands. If the measuring instrument is adapted to measure the capacitance of a sample in order to determine its water content, an increase in capacitance due to water is largely nullified by the decrease in density of the sample.

When water is added to a dry clay-bonded sand and this sand is milled or mixed and disturbed by transportation along a belt, the density of the sand will be appreciably lower than if no water had been added. If Erith silica sand containing 5% bentonite clay in a dry condition is poured into a belt, the packing density will be approximately 1.06 grams/cc. If the sand contains 2.5% moisture the packing density may fall to as low as 0.5 gram/cc.

If pressure is applied to the dry sand and the moist sand, the dry mix will compact very little, but the density of the moist mix will increase considerably. It can be shown, however, that provided that the compaction pressure is above approximately 300 lbs./in.$^2$ the change in density of the compacted sample with change of water content of a clay-bonded sand is small. The small change of density of the sand with change of moisture at this pressure is not likely to nullify the increase in electrical capacitance brought about by an increase in water content.

It can be shown that the capacitance of an electrode system in which the dielectric is sand changes in proportion to the moisture content of the sand provided the packing density remains constant and that errors or inconsistencies in the determination of water content can be successfully neutralised or eliminated, for all practical purposes, if the body of material under test is first subjected to a predetermined minimum value of pressure and it has been proposed to obtain intermittent indications of moisture content of sand by periodically compressing different samples of sand and subjecting the said samples while compressed to a test of electrical conductivity or dielectric constant. So far as foundry moulding sands are concerned we have found practically useful results are unobtainable by the measurement of conductivity even if the samples are compressed to substantially constant packing density, and preferably, the electrical characteristic chosen for the determination of water content in a method according to the present invention is the power change or loss in the sample of material under test. This power change or loss can be detected either in a tuned circuit in which the sample forms the dielectric between the electrodes of a capacity; or an attenuation of ultra high frequency (U.H.F.) radiation transmitted through the sample.

Clearly, it is advantageous to operate a practical industrial system according to the present invention at the lowest value of compression of the sample which is compatible with consistent results and, provided that the above-mentioned lower limit is observed for materials such as foundry moulding sands, the working pressure exerted on the sample in an apparatus according to the present invention can with advantage be variable to suit normal working conditions.

The method according to the present invention is basically a batchwise process in that a sample must be first compressed to the predetermined density before a measurement of the electrical characteristic is made. However, it can effectively be made a continuous process for inelastic materials by compressing a sufficient number of samples in quick succession under standard conditions and in a measuring cell of sufficient size to accommodate a plurality of compressed samples and feeding the dense material through a continuously operative measuring zone.

An apparatus according to the present invention consists of means for compressing successive samples of granular material under standard conditions, and means for subjecting compressed granular material in a measurement zone through which the compressed samples are moved and which always contains some of the compressed granular material to a source of electrical energy so as to determine the value of a given electrical characteristic of the sample at the predetermined density.

Measurements can be made on samples in a tubular measuring cell having a removable closure at one end and a compression plunger at the other, automatic control means preferably being provided to govern the movements of the closure and the compression plunger to ensure the successive steps of compression, traverse through the measurement zone, and ejection of compressed material followed by the delivery of a further sample to the measuring cell.

In order to determine the effect on the density of the product of varying weights of clay-bonded sand at varying water contents, compacted in a tube with a fixed force, a series of tests was carried out.

Two sands were prepared, Erith silica sand+5% Western bentonite clay, and Bromsgrove Red sand, each at two water contents. Three successive specimens or charges of each of these mixtures, each charge weighing, in turn, 60, 120 and 180 grams, were placed in a 2-in. diameter specimen tube or measuring cell and were compacted with forces of 1,000 lb., 2,000 lb. and 3,000 lb. The results of these tests are shown in Tables 1 and 2 and FIGURES 1 and 2 of the accompanying drawings.

TABLE 1.—ERITH + 5% BENTONITE

| Weight of sand, gms. | Water Content, percent | Compacting Force | | |
|---|---|---|---|---|
| | | 1,000 lbs. Density, gms./cc. | 2,000 lbs. Density, gms./cc. | 3,000 lbs. Density, gms./cc. |
| 60 | 1.7 | 1.500 | 1.524 | 1.540 |
| 120 | 1.7 | 1.499 | 1.523 | 1.552 |
| 180 | 1.7 | 1.506 | 1.527 | 1.538 |
| 60 | 3.2 | 1.521 | 1.545 | 1.559 |
| 120 | 3.2 | 1.520 | 1.547 | 1.569 |
| 180 | 3.2 | 1.513 | 1.540 | 1.560 |

TABLE 2.—BROMSGROVE RED SAND

| Weight of sand, gms. | Water Content, percent | Compacting Force | | |
|---|---|---|---|---|
| | | 1,000 lbs. Density, gms./cc. | 2,000 lbs. Density, gms./cc. | 3,000 lbs. Density, gms./cc. |
| 60 | 2.8 | 1.609 | 1.643 | 1.661 |
| 120 | 2.8 | 1.610 | 1.637 | 1.656 |
| 180 | 2.8 | 1.590 | 1.635 | 1.652 |
| 60 | 6.5 | 1.689 | 1.720 | 1.769 |
| 120 | 6.5 | 1.685 | 1.729 | 1.740 |
| 180 | 6.5 | 1.670 | 1.722 | 1.798 |

These results show that, at any fixed compacting pressure, a change in weight or in water content of the sand placed in the cell tube would not markedly affect the density of the compact, and therefore would not affect any indication of water content by means of a capacitance measurement.

Investigations showed, however, that when using capacitance measurements to determine moisture content in sands having a significant proportion of coke dust—a residue, after use in a foundry, of the coal dust originally included in the sand—the conductivity of the sand becomes sufficiently high to disturb the accuracy and sensitivity of the apparatus. An approximate permissible maximum content of coke dust for capacitance measurements appear to be 2%. Above this figure, also, the compaction plungers of the apparatus to be described below with reference to FIGURES 7 to 9 of the accompanying drawings have a marked effect on the measurements. Hence, for coke dust contents at least in excess of 2%, it is preferred to use a conventional ultra-high frequency absorption technique.

The present invention will now be described, by way of example only, with reference to the accompanying drawings in which:

FIGURES 3 to 6 are curves illustrating various characteristics of certain foundry moulding sands;

FIGURE 7 is a schematic cross section of the compacting and measuring cell of a gauge according to the present invention;

FIGURE 8 shows the layout of the compaction plungers and control system;

FIGURE 9 is an assembly of the plungers and measuring cell;

FIGURES 10 to 14 are circuit diagrams of the pressure fluid control system;

FIGURE 15 is a block diagram of a U.H.F. measuring instrument;

FIGURE 16 is a sectional elevation of the cell of FIGURE 15;

Figure 1:
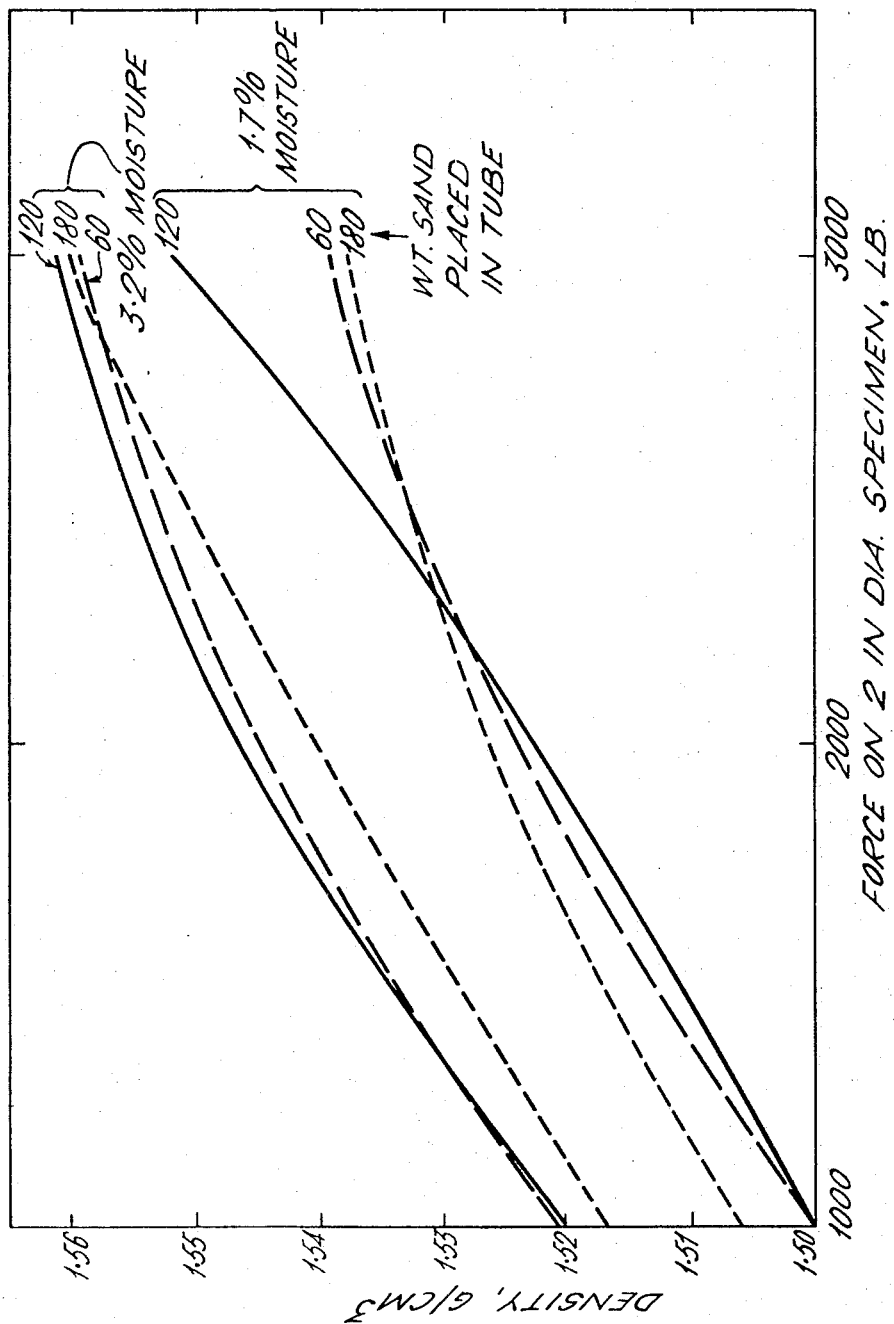
Figure 2:
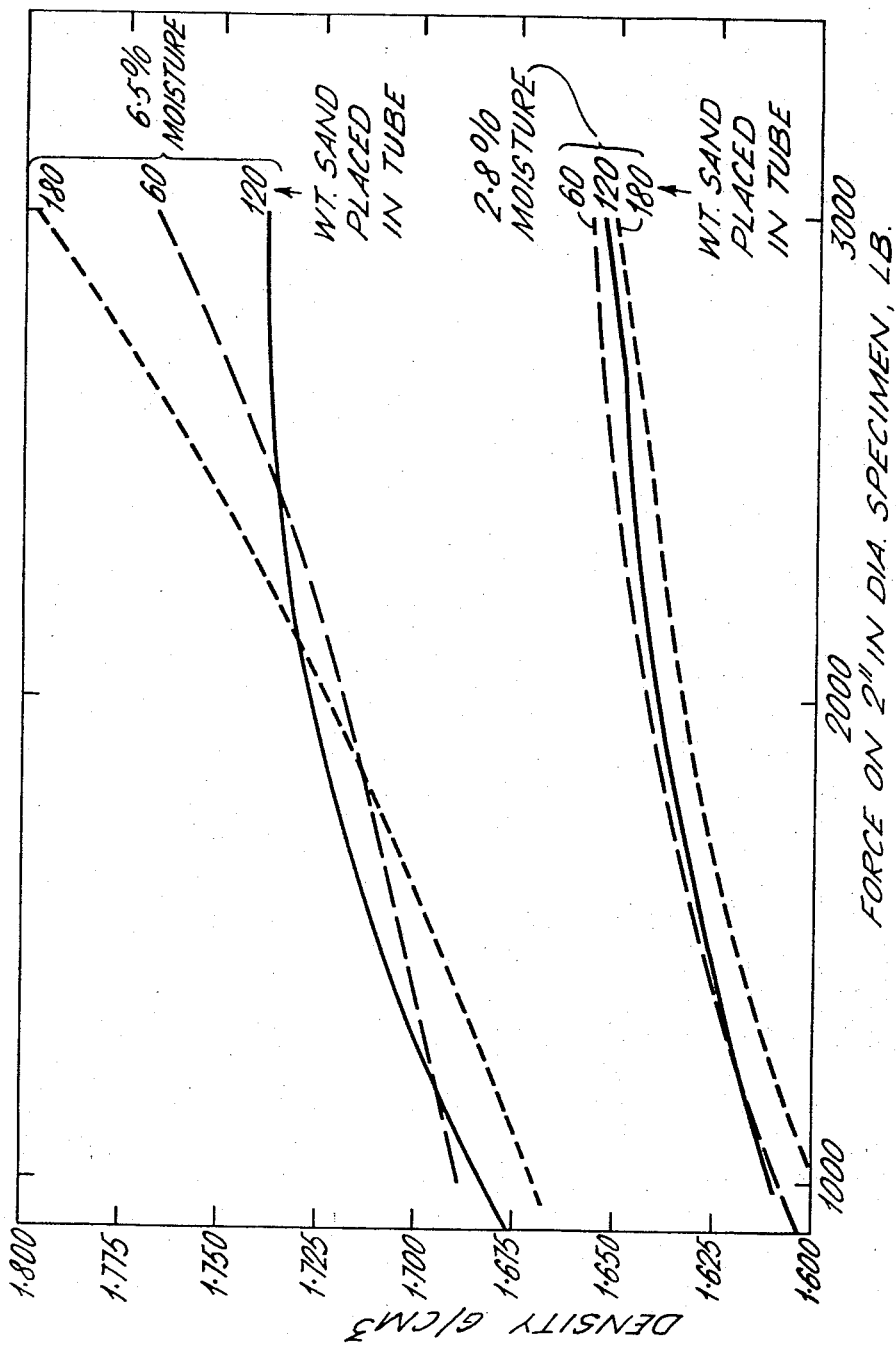

Referring first to FIGURES 7 to 9 of the drawings, the sand to be tested is introduced into a substantially vertical intake tube 10 from any convenient gate or blade mechanism indicated schematically at 11. The lower end of the intake tube 10 opens into an inclined measuring tube or cell 12, whose lower end is adapted to be closed by a retractable plunger 14. The plunger 14 is operated by a cylinder 15 (FIGURES 8 and 9) which is connected to a source of pressure fluid which also serves to energize a similar cylinder 16, (FIGURES 8 and 9), at the upper end of the instrument. This cylinder operates an upper plunger 17 which closes off the measuring tube or cell 12 at a level above its junction with the intake tube 10. The plunger 17 is adapted to be displaced down the measuring tube or cell 12 to a position below its junction with the intake tube 10 so as to be capable of compacting a charge of sand—indicated at 18—against the plunger 14 when in its tube closing position. When the plunger 14 is retracted (as shown in FIGURE 7), a cut-off blade 13 can be moved across the open lower end of the measuring tube 12 by a pneumatic cylinder 20.

Around the inside wall of the cell 12 adjacent to its lower end are placed a pair of part-cylindrical diametrically opposed capacitor electrodes 19 which are connected to a conventional capacity measuring instrument (not shown).

In use, the instrument is placed beneath the discharge outlet of a sand hopper or storage bin, or beside a delivery belt, so that sand can be delivered in successive batches through the intake tube 10 into the cell 12. Each batch is separately compressed in the cell under a pressure in excess of 300 lb./in.$^2$ to form a slug before a new batch is introduced through the inlet tube 10. The charge 18 whose capacity is to be measured is made up of a number of such slugs or compacts. After each measurement, some or all of the charge is ejected, and a new charge 18 is built up. Where the apparatus is to be used for testing hot sand, it will probably be necessary to maintain the inlet tube 10 at an elevated temperature to prevent the sticking of sand to the tube wall.

Before a new charge is built up in the cell 12, the lower plunger 14 is moved up to close its bottom end and provide the abutment for the compression of each slug by the upper plunger 17 into a compact mass at controlled pressure. When a sufficient number of slugs has been thus compacted in the tube 12 to constitute the dielectric 18 of a capacitor between the plates 19, a capacity measurement is made, and the lower plunger 14 is retracted to open the bottom of the cell or measuring tube 12. The upper plunger 17 is then advanced to the limit of its travel, and the protruding compact of sand is cut off by the blade 13 and discarded or returned to stock. The upper plunger 17 is then retracted to its upper limit position above the junction of the tubes 10 and 12 and the lower plunger 14 is advanced to close the bottom of the measuring tube or cell 12. The cycle is then repeated.

During the passage of the compacts through the cell 12, continuous measurement is made of the capacitance of the system, thereby obtaining the water content of the sand when operating as a dielectric. The cell 12 is at no time empty of sand and each individual charge of sand represents only a portion of the total sample presented to the capacitor electrodes 19.

*Automatic sequence control*

The sequence of events of the elements 11, 13, 14, 17 and 19 can be set up as a programme on an automatic control mechanism so that measurements are taken sufficiently rapidly to ensure that the batch-wise measurement of water content provides a substantially continuous output of tested sand. If desired, the output of the measuring instrument can be used as a control signal to govern the supply of water to the main stock of sand being sampled.

Figure 12:
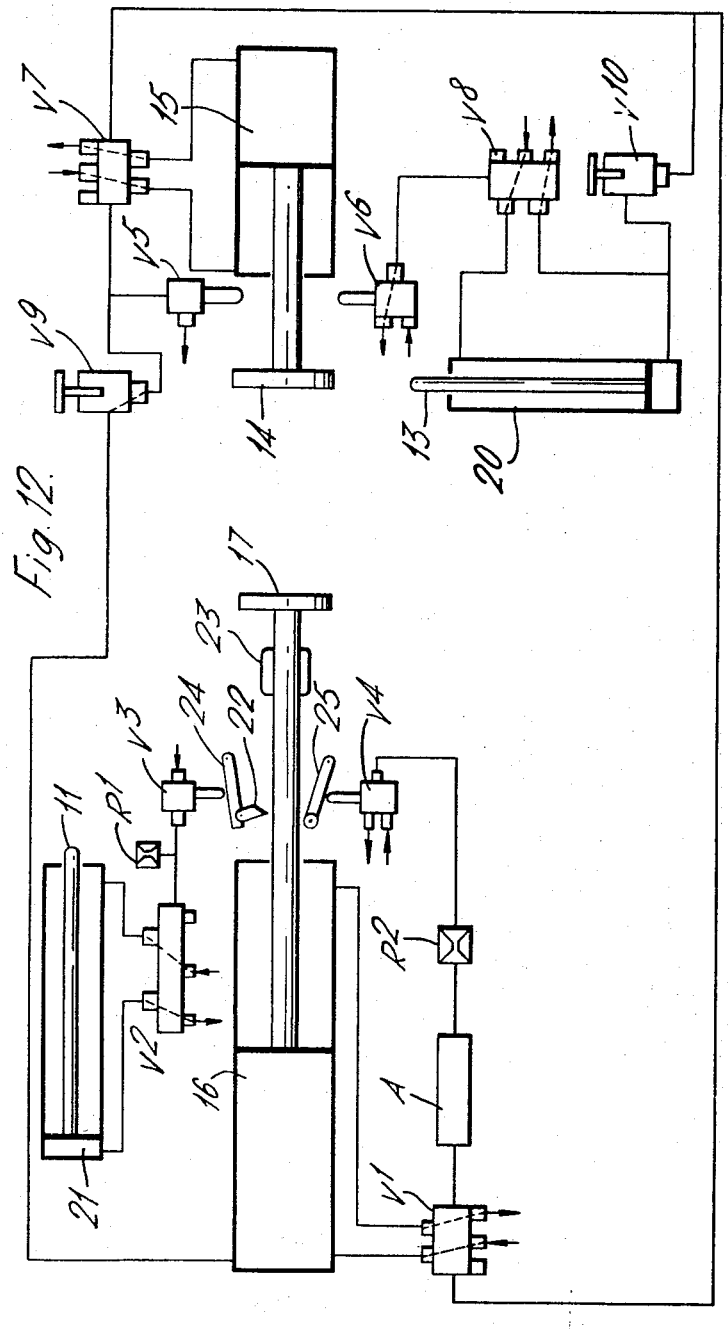

One form of such automatic sequence control mechanism is shown in FIGURES 10 to 14. Each figure represents a different stage in the sequence of operations, although it will be understood that in a continuously operating system the time factor and vectorial quantities cannot be represented by static illustrations. The stages which, within the above limitations, are represented in the several figures are as follows:

FIGURE 10—charging the measuring tube 12 with sand;

FIGURE 11—compacting the charge;

FIGURE 12—discharging the compacted and measured sand;

FIGURE 13—cutting off the discharged sand charge, and

FIGURE 14—re-closing the measuring tube 12 in readiness for the next cycle.

The control mechanism is pneumatically operated and consists of a series of valves $V_1$–$V_{10}$, of which the valves $V_3$ and $V_5$ are simple mechanically operated on-off valves; $V_9$ and $V_{10}$ are pressure-operated on-off valves; $V_4$ and $V_6$ are change-over valves for connecting a single line to pressure or exhaust, and $V_1$, $V_2$, $V_7$ and $V_8$ are cylinder reversing shuttle valves, the valves $V_2$ and $V_8$ being spring-loaded. The valve $V_3$ is operated by a one-way trip which includes a pivoted fingers or pawl 22 controlled by a cam 23 on the compacting plunger 17. This cam also operates the valve $V_4$. The valve $V_3$ serves only to apply air pressure to the shuttle valve $V_2$ or to cut it off, whilst the valve $V_5$ connects the shuttle valve $V_7$ to exhaust when operated.

The pneumatic circuit also includes two restrictors $R_1$ and $R_2$ and an air reservoir or accumulator A, the latter being in series with the restrictor $R_2$ and shuttle valve $V_1$ and serving to introduce a time delay in the functioning of this valve as will be described below. The circuit operates as follows:

Referring first to FIGURE 10, the parts are shown in positions immediately prior to the commencement of the charging of the cell 12 with a sand slug. In the position shown, the compacting plunger 17 is being retracted and has nearly reached the limit of its travel, whilst the closure plunger 14 is being advanced into its operative position. At the instant depicted in the figure, the sand feed gate or blade 11 is being moved by its cylinder 21 to its fully operative position.

As the compacting plunger 17 approaches its fully retracted position, the cam 23 engages the finger or pawl 22 which, in this direction of deflection, is not free to ride idly over the cam. The pawl thus raises an actuating lever 24 which opens the valve $V_3$ and admits air at line pressure to the restrictor $R_1$ and the shuttle valve $V_2$ in parallel. The pressure drop at the latter due to the shunt action of the restrictor is not sufficient to prevent actuation of the shuttle valve to the position shown in FIGURE 10, in which line pressure is admitted to the back end of the cylinder 21 and the front end is opened to exhaust. The feed blade 11 is thus advanced to its operative position.

At the same time as it actuates the valve $V_3$, the cam 23 also actuates the valve $V_4$ through a cam follower lever 25. The valve $V_4$ connects the accumulator A to line pressure through the restrictor $R_2$ which causes a slow build-up of pressure in the accumulator. The rate of build-up is chosen so as to permit the compacting plunger 17 to retract to the limit of its travel before being advanced to compact the new charge. It also allows enough time for the required quantity of sand to be fed to the measuring tube or cell 12.

When the compacting plunger 17 has fully retracted, the cam 23 disengages the pawl 22 (FIGURE 11) and the valve $V_3$ cuts off the pressure supply from the feed cylinder 21. The pressure in the actuating cylinder of the shuttle valve $V_2$ is now vented through the restrictor $R_1$, and when the pressure has been bled off sufficiently to allow the loading spring on the valve $V_2$ to reassert itself, the valve changes over the port connections of the cylinder 21 and allows the feed blade 11 to be withdrawn. The cam 23, however, does not disengage the follower lever 25, so that the valve $V_4$ remains open to line pressure and the build-up of pressure in the accumulator A continues until it reaches the value at which the shuttle valve $V_1$ reverses the port connections of the compacting cylinder 16. This delay period must exceed the delay on the shuttle valve $V_2$ to ensure cut-off of the supply of sand before the plunger 17 is advanced on its compacting stroke.

When the valve $V_1$ reverses, the compacting plunger 17 is advanced, and as the cam passes the pawl 22, the latter rides idly over it without again opening the valve $V_3$ to ensure that the feed blade 11 is not prematurely reactuated to its feed position.

During the compacting stroke which begins with the parts in the positions shown in FIGURE 11, the cam 23 releases the lever 25—as shown in FIGURE 12—and changes over the valve $V_4$ to exhaust. The accumulator A now discharges slowly through the restrictor $R_2$, and when its pressure has fallen sufficiently the shuttle valve $V_1$ is left without bias in its compacting stroke position. As soon, however as the plunger 17 meets the resistance of the sand charge in the cell 12 it is slowed down, and pressure begins to build up in the pressure operated valve $V_9$. As soon as the predetermined load has been applied to the charge the valve $V_9$ opens. This allows line pressure to be fed to the shuttle valve $V_7$ controlling the closure or abutment plunger 14 and causes it to reverse. Meanwhile the capacity of the sample between the electrodes 19 is continuously measured.

The abutment plunger 14 is now retracted, and the charge is ejected by the plunger 17 which is still under line pressure. FIGURE 12 shows this action partially completed. It will be understood that the stroke of the plunger is so controlled that a portion only of the charge is ejected, the space or measurement zone between the capacitor electrodes always containing compacted samples of sand.

In FIGURE 13, the abutment plunger 14 is fully retracted and the compacting plunger 17 has completed its ejection stroke and has just begun its return stroke. In its fully retracted position, the head of the plunger 14 engages and operates two valves $V_5$ and $V_6$. $V_5$ is opened to exhaust, thereby releasing the pressure which caused the shuttle valve $V_7$ to reverse when compacting of the sand was completed. $V_6$ is opened to line pressure which it now applies to the spring-loaded shuttle valve $V_8$, so that this is reversed and applies line pressure to both the cut-off cylinder 20, which causes the cut-off blade 13 to be rapidly traversed across the open end of the measuring tube 12 to sever the projecting sand slug, and also to the pressure-operated valve $V_{10}$. This valve $V_{10}$ opens when the pressure in cylinder 20 approaches line pressure and applies this pressure to the shuttle valves $V_1$ and $V_7$ simultaneously.

$V_1$ is now free to reverse the connections to the compacting cylinder 16 by virtue both of the exhaust connection through the valve $V_4$ and of the fact that the accumulator A has lost its pressure charge through the restrictor $R_2$. Line pressure is now removed from the pressure-operated valve $V_9$ through the inner end of the compacting cylinder 16 and it has closed. $V_7$ is therefore free to revert to its forward connections to the abutment cylinder 15.

As soon as the abutment plunger 14 has advanced a short distance from its fully retracted position, the valves $V_5$ and $V_6$ are released, $V_5$ re-seals the connection between the pressure-operated valve $V_9$ and the abutment shuttle valve $V_7$ in readiness for the next operation thereof, while $V_6$ connects the hitherto pressurised spring-return valve $V_8$ to exhaust. Immediately, the valve $V_8$ reverses the connection to the cut-off cylinder 20 and the valve $V_{10}$ closes. The cut-off blade 13 is now rapidly withdrawn from the path of the advancing abutment plunger 14 and the operation of the valve $V_8$ connects the hitherto pressurised sides of the shuttle valves $V_1$ and $V_7$ to exhaust. The cycle of operation is completed when the parts have returned to their original positions.

FIGURE 14 shows the cut-off blade 13 retracted, the abutment plunger 14 half-way to its measuring tube closing position, and the compacting plunger 17 about to reoperate the valves $V_3$ and $V_4$ through its cam 23, and the pawl 22 and follower lever 25, respectively. The stage of FIGURE 10 will then be restored and the cycle automatically repeated.

Obviously, hydraulic or electric equivalents of the above pneumatic system could be used if preferred.

Throughout the foregoing description it has been assumed that the valves $V_3$ and $V_4$ are operated by a common cam 23—for example, in the form of a sleeve on the plunger rod. It will, however, be understood that each valve may be controlled by a separate respective cam, and these separate cams may be independently adjustable to give the optimum time cycle and phasing. The restrictors $R_1$ and $R_2$ may also be adjustable so as to provide some measure of control over the phasing of the shuttle valves.

Where other means than a blade 11 is used for collecting a charge of sand from a moving conveyor, the associated shuttle valve $V_2$ may require to be replaced by an appropriate alternative mechanism.

In a practical example of instrument as described above, the cell 12 was constructed from glass fibre and epoxy resin, and was of a nominal internal diameter of 2" whilst the measuring section was 6" in length. It was found expedient to give this section a slight taper outwards towards its lower end to assist in ejection of the charge. Into the inner wall of this tube were embedded two part-cylindrical copper plates 19 measuring 3" by 2½". The capacitance of this assembly when emptied was 3.5 pf. The material of the tube exhibited a very low moisture absorption and had high abrasion resistance. A tube made of a phenolic resin reinforced by a fabric was also successfully used.

Figure 3:
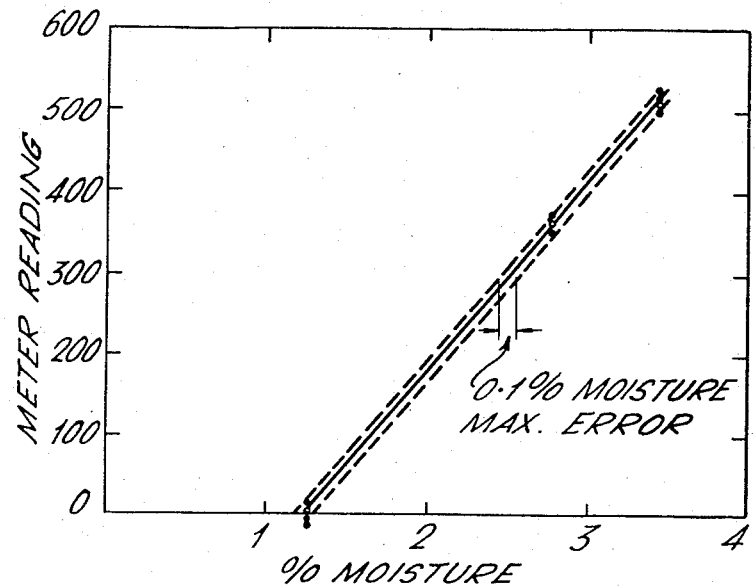

Various sands at various moisture contents were measured in the cell 12 by the following method:

Two successive slugs of sand were compacted in the cell 12 between the electrodes 19 under an axial loading between the electrodes 14 and 17 of 1,000 lbs. Each slug consisted of 160 grams of sand and was individually compacted before measurement of the total charge was made. The results obtained with Erith silica sand plus 5% bentonite and with Bromsgrove Red sand are shown in Tables 3 and 4 and FIGURES 3 and 4 of the drawings. In all cases, the test was repeated four times for each value of water content. All the meter readings noted are comparative and not absolute values of capacitance. All points are shown on the curves in FIGURES 3 and 4, and the outer lines embracing each curve indicate the likely limits of accuracy for estimation of water content of each sand by this method.

TABLE 3.—ERITH SILICA SAND+5% BENTONITE

| Moisture, Percent | Meter Readings | |
|---|---|---|
| 1.25 | +12<br>−15 | −20<br>+2 |
| 2.76 | 355<br>359 | 377<br>363 |
| 3.44 | 514<br>510 | 525<br>500 |

TABLE 4.—BROMSGROVE RED SAND

| Moisture, Percent | Meter Readings | |
|---|---|---|
| 2.9 | 382<br>387 | 383<br>385 |
| 4.6 | 488<br>491 | 492<br>489 |
| 6.5 | 524<br>530 | 527<br>526 |
| 7.7 | 590<br>578 | 579<br>582 |

The maximum error likely when using Erith silica sand +5% bentonite is 0.1%, and when using Bromsgrove Red sand 0.2%. These levels of error would be quite acceptable in any foundry.

*Effect of variation of coal dust content*

Figure 5:
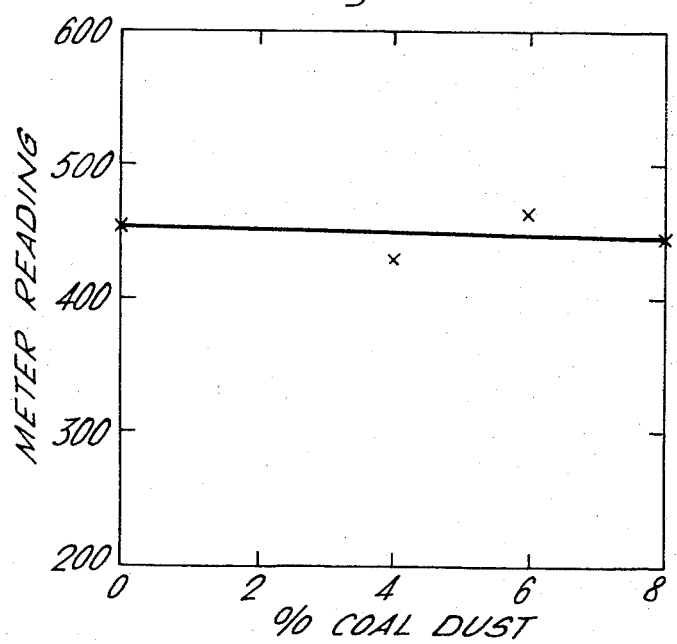

In order to determine the possible effect of a variation in coal dust content on the results obtained by this method a series of sands were made up containing 0%, 4%, 6% and 8% of coal dust. The effect of these varying coal dust contents are shown in the following Table 5 and the graph in FIGURE 5.

TABLE 5

| Moisture, Percent | Meter Reading | Percent Coal Dust |
|---|---|---|
| 2.5 | 452 | 0 |
| 2.5 | 430 | 4 |
| 2.5 | 464 | 6 |
| 2.5 | 445 | 8 |

From the graph the maximum deviation from the indicated moisture when a change of 2% in the coal dust content occurs, would be ±0.15%. This would not be expected to give any serious trouble in operation.

*Effect of variation of clay content*

In order to determine the effect of clay content on the readings obtained, three sands were made up having 3%, 5% and 7% bentonite clay addition to Erith silica sand. Three samples of each sand at each moisture content were tested, and the results of these tests appear in Table 6 and the graph in FIGURE 6.

TABLE 6

| Moisture, Percent | Meter Reading | | Clay Content, Percent |
|---|---|---|---|
| 1.36 | 158<br>160 | 165 | 3 |
| 2.34 | 405<br>405 | 400 | 3 |
| 3.44 | 479<br>482 | 481 | 3 |
| 1.44 | 144<br>145 | 136 | 5 |
| 2.52 | 451<br>454 | 452 | 5 |
| 3.42 | 586<br>581 | 581 | 5 |
| 1.66 | 129<br>132 | 131 | 7 |
| 2.30 | 420<br>418 | 416 | 7 |
| 3.40 | 560<br>556 | 565 | 7 |

It is apparent from the above results that variations of clay content will influence the reading of a moisture meter based upon capacitance measurement, but the effects of varying clay content are not likely to be great enough to seriously reduce reliability in a given foundry, provided the sand mix remains of the same basic type.

From all the foregoing results it is apparent that the water content of moist sand can be reasonably accurately measured by compacting a substantially regular cross-sectional charge of sand under a controlled load between the electrodes of a measuring capacitor coupled in circuit with an AC supply and a conventional indicator, recorder or process controller. The necessary conditions are that the compacting force should be relatively high and constant, and that—at least for foundry purposes—the coal dust and clay contents should not vary very widely throughout any given batch or series of batches.

Although absolute measurements of capacity might well be capable of evaluation, it is not thought necessary to ensure this since it would be possible to calibrate any given meter for any given type of base sand or other parameters of the system.

Tests have shown that, when determining moisture content on the basis of electrical capacity measurements, a correction factor should be applied to the instrument readings to take account of its temperature sensitivity. Experiments were made with two sands having different water contents over a range of temperature between 20° C. and 60° C. Such a range is unlikely to be equalled in normal practice where the upper limit of temperature of test samples rarely exceeds 40° C., and is more frequently of the order of 35° C.

The two sands used for the temperature sensitivity investigation consisted of foundry sands based on Bromsgrove Red, the first having an initial water content of 3.4% and an initial temperature of 50° C. and the second having an initial water content of 2.1% and an initial temperature of 61° C. The water contents were determined gravimetrically. A curve was plotted for each sand showing instrument readings against temperature, and it was found that as the temperature increases, the instrument readings also increase for constant water content. Although the curve is not a straight line in either case, it is sufficiently nearly so over the normal working range of temperatures, and adequate correction of the instrument can be achieved by incorporating into its electrical circuit a temperature-responsive resistance. In the two samples noted above, the required correction is the equivalent of 0.13% water per degree centigrade.

The overall stability and limits of accuracy of the apparatus in practice were investigated by feeding alternately to it batches of two sands, one having a nominal water content of 3.3% and the other a nominal water content of 5.5%. Each batch took 12 minutes to pass through the apparatus, and readings were taken at 2-minute intervals. Sixteen batches of the sand containing 3.3% water and fifteen batches of the other sand were measured, and the results were as follows:

| Water content | 3.3% | 5.5% |
| --- | --- | --- |
| Mean, all readings | 3.36 | 5.33 |
| Mean, min. readings | 3.57 | 5.27 |
| Mean, max. readings | 3.68 | 5.40 |
| Max. error from mean | +0.395, −0.318 | +0.59, −0.28 |
| Max. error (percent water) | +0.38, −0.54 | +0.56, −0.63 |

The above results show that the performance of the apparatus will normally be well within acceptable limits of stability and sensitivity.

For a large number of sands in use within foundries it is possible, provided a constant density of pre-compaction is used, to measure moisture content by means of a capacity-sensitive instrument. It becomes impossible, however, to ensure reliable results when, for any reason, the sand sample has a high conductance. This is the case when sand contains large proportions of coke dust, which are the residue of an initial addition of coal dust, or when it becomes highly acid or alkaline. Again, in order to apply the capacitance measurement method using the compaction machine described above, it is necessary to use an insulating tube 12 on the apparatus around which the capacity plates 19 are placed. The relatively high friction developed between the sand and any insulating tube yet tested makes it impossible to force a very large slug of sand through the tube 12 at any one time. All materials have a dielectric constant and will, therefore, all give some changes in capacitance when their content is changed by the sand sample. The capacitance method, therefore, does not only sense water changes in water content. Much of this difficulty is avoided if moisture content is measured by a U.H.F. attenuation technique in place of the capacitance method.

When using the U.H.F. method of moisture content determination it is possible to use a steel tube for the passage of the sand sample, as shown at 26 in FIGURE 16. Centrally of its length, this tube has a pair of diametrically opposed rectangular openings 27, 28, 29, 30 which register with the mouths of standard 1″ × ½″ waveguides 29, 30. These openings are plugged with blocks 31, 32 of hard insulating material to prevent ingress of sand. The amount of sand which can be passed through this tube, per stroke of the piston 17, is very much larger than when using a completely insulated tube. The accuracy of moisture level determined is unaffected by coal dust content, clay content and practically any other dry additive material except coke, which has an effect on the reading obtained. Since the coke content of the foundry sand will not vary appreciably from week to week, it is possible to re-set the instrument very easily to take account of any changes which may occur.

The apparatus for subjecting compacted sand samples in the tube or cell 26 to U.H.F. radiation is shown, in block diagram form, in FIGURE 15. It comprises a klystron oscillator 33 to produce approximately 22 milliwatts at 10,000 megacycles. This output is passed to an isolator 34 to prevent any reflections of micro-wave power from affecting the klystron during operation. The power is then passed through a conventional attenuator 35 which consists of a strip of insulating material whose position in the guide determines the amount of power absorbed within the attenuator itself. This attentuator is used to pre-set the level of the micro-wave power fed to the tube or cell 26 via one of the wave-guides 29, 30. The output from the cell 26 is taken through the other wave-guide and passed through a servo-controlled attenuator 36 and then to a detector 37 and amplifier 38 which is coupled by a feed-back loop 39 of the attenuator 36.

The input power is modulated at, say, 3.2 kilocycles per second so that the detector 37 feeds an audio signal at 3.2 kilocycles to the amplifier 38. Any changes in level of this signal will cause the servo-controlled attenuator 36 to move in such a manner that the signal at the detector 37 returns to its previous level.

The sand absorbs micro-wave power to an extent which depends on the moisture content of the sample. With few exceptions, no absorption will take place when dry material is placed in the tube 26 and, therefore, the only attentuating medium present will be water. The exception to this in the case of foundry sands is when coke is present, as this will tend to absorb some power.

The change in level of water content in the sand sample cannot be determined by measuring the voltage output at the detector 37, the change in power at the detector bears little relationship to its voltage output, since even though the detector follows an approximate square law, this relationship changes with changes in power level. It has been found that when the change in power level passing through the specimen is measured in decibels, this is directly proportional to the water content of the sand within the cell 26. The response of the attenuators 35, 36 is very nearly linear with attenuation in decibels, so that the movements of these attenuators can be related directly to the water content of the sand. In order to control the addition of water to any system, or to indicate water content, it is only necessary to sense the linear movement of the servo-controlled attenuator 36 in any conventional manner.

Various tests were made on the apparatus of FIGURES 8 to 14, using a U.H.F. measuring tube or sand cell 26 (FIGURE 16) in place of the capacitor tube 12 (FIGURES 8 and 9) and a measuring circuit as shown in FIGURE 15.

Figure 17:
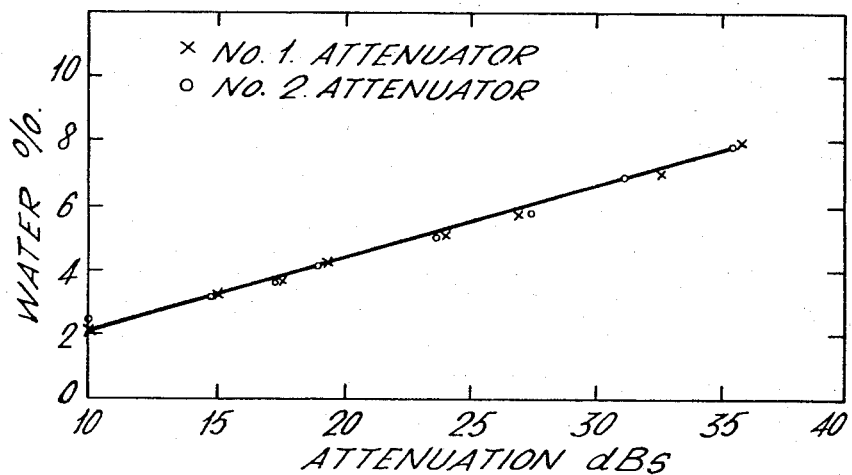
FIGURES 17 and 18 are response curves for an attenuator of FIGURE 15.
Figure 18:
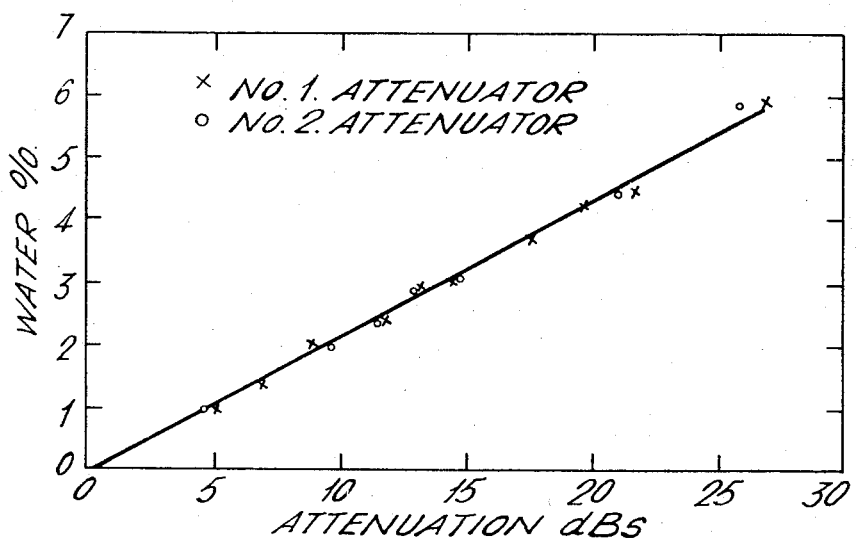

FIGURES 17 and 18 show the calibration curves for two attenuators each suitable for use at 36 in the circuit of FIGURE 15. The curve of FIGURE 17 was obtained with Bromsgrove Red sand in the cell 26 and that of FIGURE 18 was obtained with Erith sand containing 5% bentonite. It is clear from these curves that both attenuators behave substantially identically, and that their attenuations are linear with respect to water content of the sand.

Figure 19:
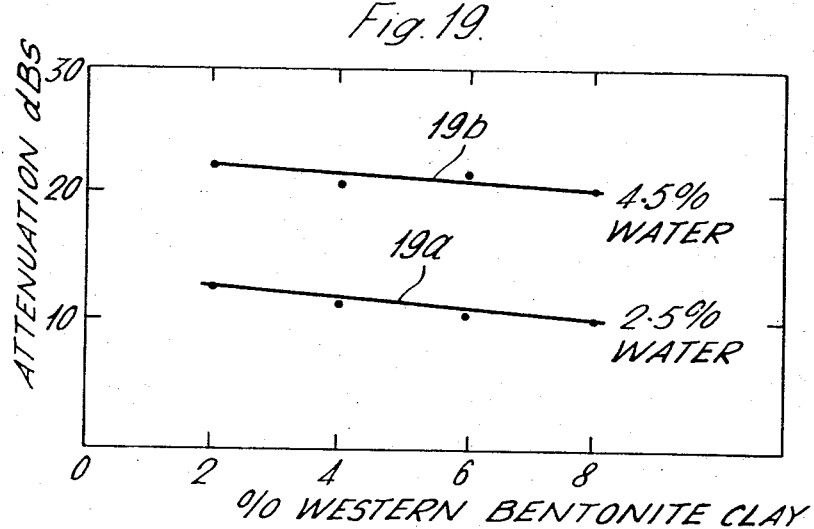
FIGURES 19 to 22 are calibration curves of the instrument of FIGURE 15 for various sand mixtures.

FIGURE 19 illustrates the effect on attenuation of varying the clay content with constant moisture content. The curves were obtained using Erith silica sand with percentages of Western bentonite clay varying from 2% to 8%, the curve 19a relating to a moisture content of 2.5% water and the curve 19b relating to a moisture content of 4.5% water. Both are linear and show a slow decrease in attenuation with increase in clay content. The variation in clay content shown is much greater than would be tolerable in normal foundry practice, where the normal range is about ±1%. Over the normal range, therefore, the slopes of the characteristics can be ignored.

Figure 20:
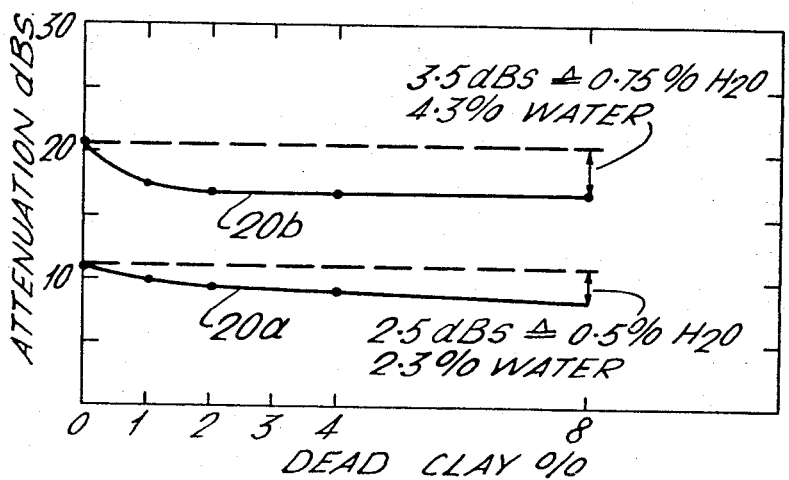

FIGURE 20 illustrates the effect of a progressive build-up of "dead" clay in two sand-clay mixtures, one of which (curve 20a) had 2.3% water content and the other (curve 20b) had 4.3% water content. The sand in each case was Erith+5% Western bentonite. Over most of the range chosen, between 1% and 8% dead clay, both curves are substantially flat, the maximum drop in attenuation at 8% dead clay amounting, in the former case, to 2.5 db—approximately equivalent to 0.5% water content—and in the latter case to 3.5 db's, equivalent to 0.75% water content. In practice, the amount of dead clay in foundry sands usually exceeds 1% and the change of amount present will have a negligible effect on the accuracy of the instrument reading.

Figure 21:
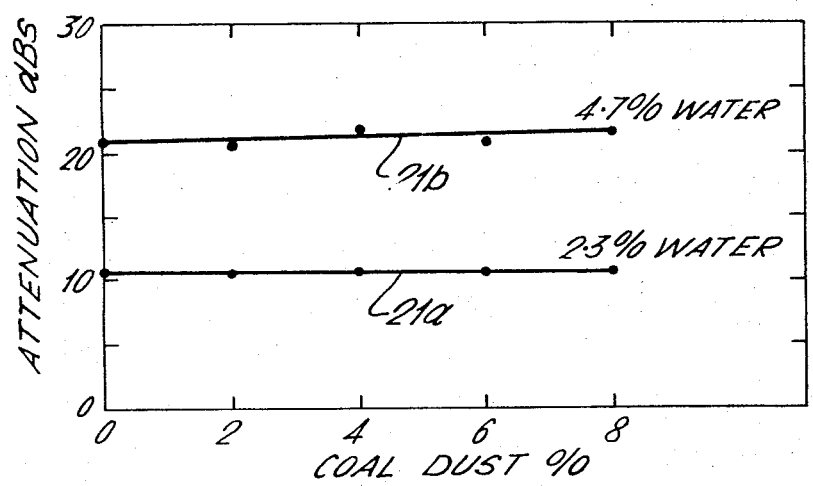

FIGURE 21 shows that the presence of up to 8% coal dust in Erith sand+5% Western bentonite at 2.3% water (curve 21a) and 4.7% water (curve 21b) has no effect on attenuation.

Figure 22:
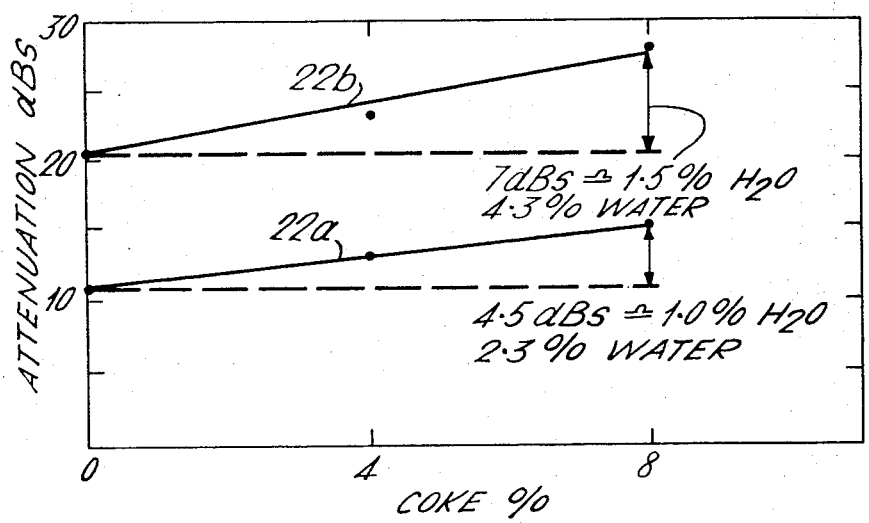

FIGURE 22 shows the effect of coke in an Erith+5% Western bentonite sand. The curve 22a is taken from a clay having 2.3% water, and curve 22b applies to a water content of 4.3%. At 8% coke in the former case, the error in attenuation is 4.5 db's, equivalent to 1% water content, while in the latter cases the error is 7 db's, equivalent to 1.5% water content. Since the coke content is not normally allowed to rise above about 3%, even these errors would normally be reduced to about one third—i.e. 0.3% water and 0.5% water, respectively. Also, in practice, any change in the value of coke content will occur slowly—for example, 0.5% per month. The correction factor for the instrument readings is therefore very small.

Figure 23:
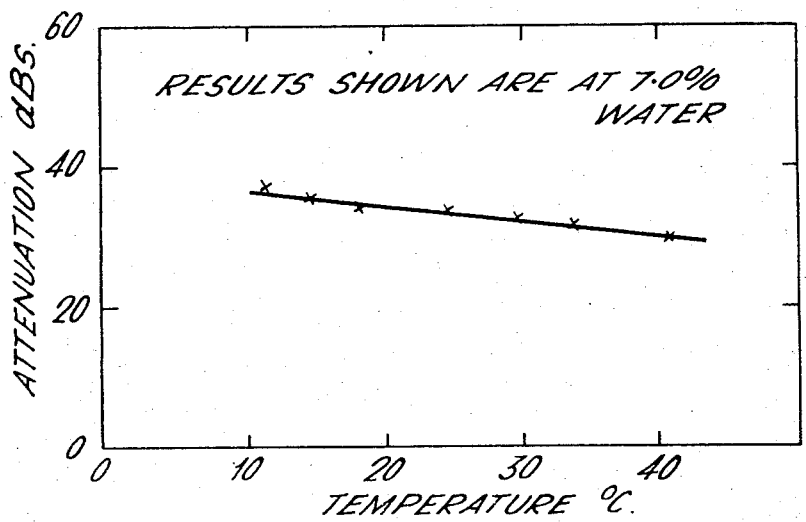
FIGURES 23 to 26 are curves showing the effect of sand temperature on the calibration of the instrument of FIGURE 15.
Figure 24:
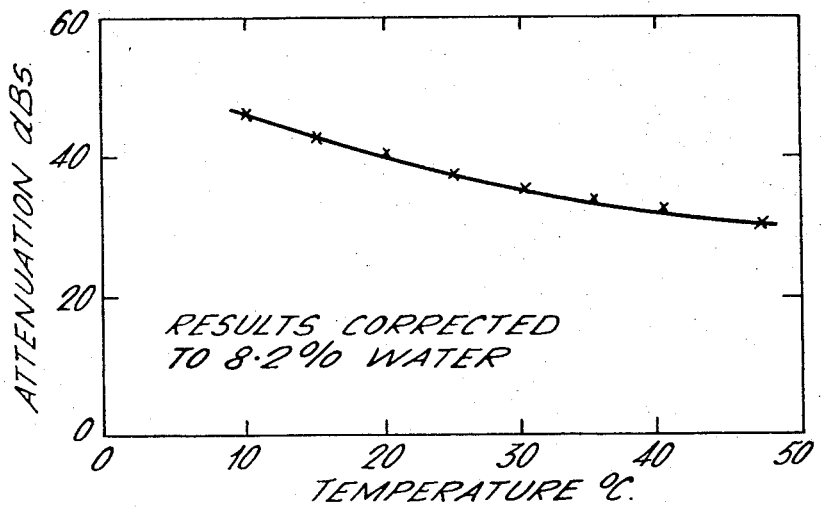
Figure 25:
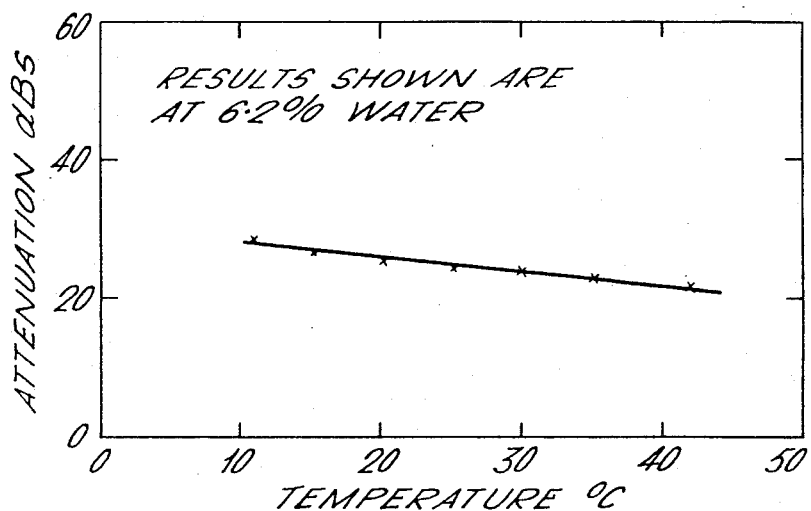
Figure 26:
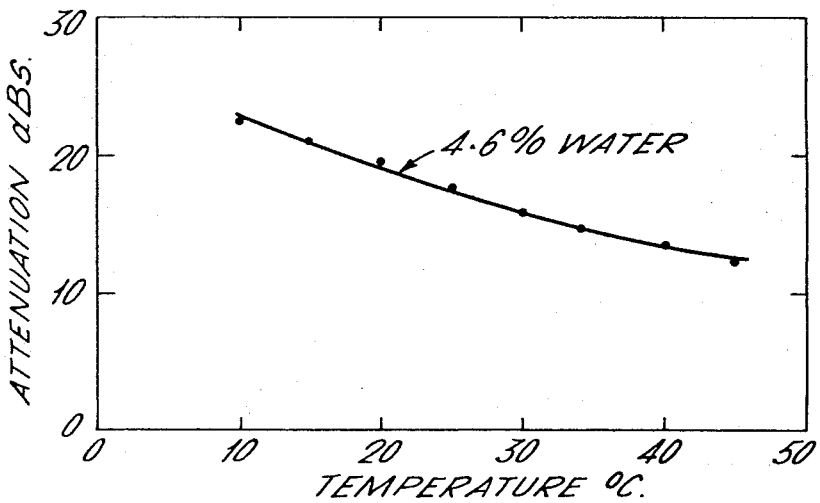

FIGURES 23 to 26 illustrate the effects of temperature variation on different sands. FIGURE 23 is the attenuation/temperature curve for Erith silica+Western bentonite+coal dust having a moisture content of 7.0% water; FIGURE 24 is the equivalent for Bromsgrove Red sand; FIGURE 25 relates to Bromsgrove Red+6% coal dust; and FIGURE 26 is for Erith silica+5% Western bentonite at a moisture content of 4.6% water. The instrument would normally include a temperature-sensitive resistor (not shown).

I claim:
1. The continuous method of determining the water content of granular material such as moulding sand which comprises extracting successive samples from a body of the granular material, successively adding said samples individually onto a previously compressed charge of material, compressing the samples onto the charge material in quick succession to a predetermined pressure at least sufficient to ensure approximately constant packing density of the charge of material notwithstanding variations in water content, feeding the charge at said density through a measuring cell affording a measurement zone and continuously measuring an electrical characteristic of said material in said zone which is variable as a known function of the water content of the compressed material.

2. The method claimed in claim 1, in which said successive samples of the granular material are of approximately equal weight and successive slugs of compressed material are ejected from the cell between successive compressions by forcing the fresh samples of granular material into the measurement zone.

3. The method claimed in claim 1, in which the charge is made up of a plurality of samples of such size in relation to the capacity of the measurement zone that said zone accommodates a charge made of a plurality of samples of the compressed material.

4. The method claimed in claim 1, in which a charge comprising a plurality of samples of granular material compressed to the approximately constant packing density are fed through the measuring cell, U.H.F. energy is fed across the measurement zone and measurement of the attenuation produced by said material in said zone is effected to obtain a measure of the water content of the granular material.

5. Apparatus for measuring the water content of granular material such as moulding sand comprising a measuring cell of approximately constant cross-section including a measurement zone and adapted to accommodate a charge comprising a plurality of samples of granular material, a removable closure at one end of the cell, a plunger reciprocable in said cell from the other end, means for introducing a sample of said material between said plunger and said closure means, plunger actuating means adapted to advance said plunger in said cell while said one end of said cell is closed by the removable closure to compress said sample to a predetermined high density onto the charge therein, said plunger actuating means being further adapted after removal of said closure from said one end of said cell, to advance the plunger to a further extent and thereby to eject a portion of the charge of granular material from the cell leaving material compressed to high density in said measurement zone and means for continuously measuring an electrical characteristic of the material in the measurement zone.

6. Apparatus according to claim 5, comprising sampling mechanism adapted to extract a sample from a body of granular material and to feed said sample to a material inlet port opening laterally into said cell adjacent the retracted position of said reciprocable plunger, said samples of granular material being of such size that the measuring cell may accommodate a charge comprising a plurality of compressed samples of granular material.

7. Apparatus according to claim 6, in which the measurement zone is of a size to accommodate a plurality of said samples.

8. Apparatus according to claim 6, comprising power operating means for said sampling mechanism, power operating means for said plunger, power operating means for said closure means and a controller for governing the sequence of operations of said sampling mechanism, said plunger and said closure means to ensure closure of said one end of the cell, introduction of a sample into the cell, compaction of the sample to a charge of the predetermined high density, opening of said one end of the cell and ejection of a portion of said granular material from the cell through said one end and for repeating the sequence to effect feeding of samples in quick succession to the cell.

9. Apparatus according to claim 7, comprising a cut-off blade traversible across said one end of the cell, power operating means for the cut-off blade, power operating means for said sampling mechanism, power operating means for said plunger, power operating means for said closure means, a controller for governing the sequence of operations of said sampling mechanism, said plunger, said closure means and said cut-off blade, to ensure closure of said one end of the cell, introduction of a sample into the cell, compaction of the sample to a charge of the predetermined high density, opening of said one end of the cell, ejection of a portion of said granular material from the cell through said one end, cutting off the ejected material from said one end of the cell and for repeating the sequence to effect feeding of samples in quick succession to the cell.

References Cited

UNITED STATES PATENTS

| | | | |
|---|---|---|---|
| 608,016 | 7/1898 | Anderson | 25—109 |
| 2,277,953 | 3/1942 | Christensen | 324—61 |
| 2,343,340 | 3/1944 | Stevens | 324—61 |
| 2,641,042 | 6/1953 | Kopp | 25—107 |
| 2,649,618 | 8/1953 | Rhodes et al. | 25—109 X |
| 2,659,860 | 11/1953 | Breazeale | 324—58.5 |
| 2,665,409 | 1/1954 | Rogers | 324—61 |
| 3,155,898 | 11/1964 | Chope | 324—61 X |

RUDOLPH V. ROLINEC, *Primary Examiner.*

WALTER L. CARLSON, *Examiner.*

A. RICHMOND, P. F. WILLE, *Assistant Examiners.*